Figure 5:
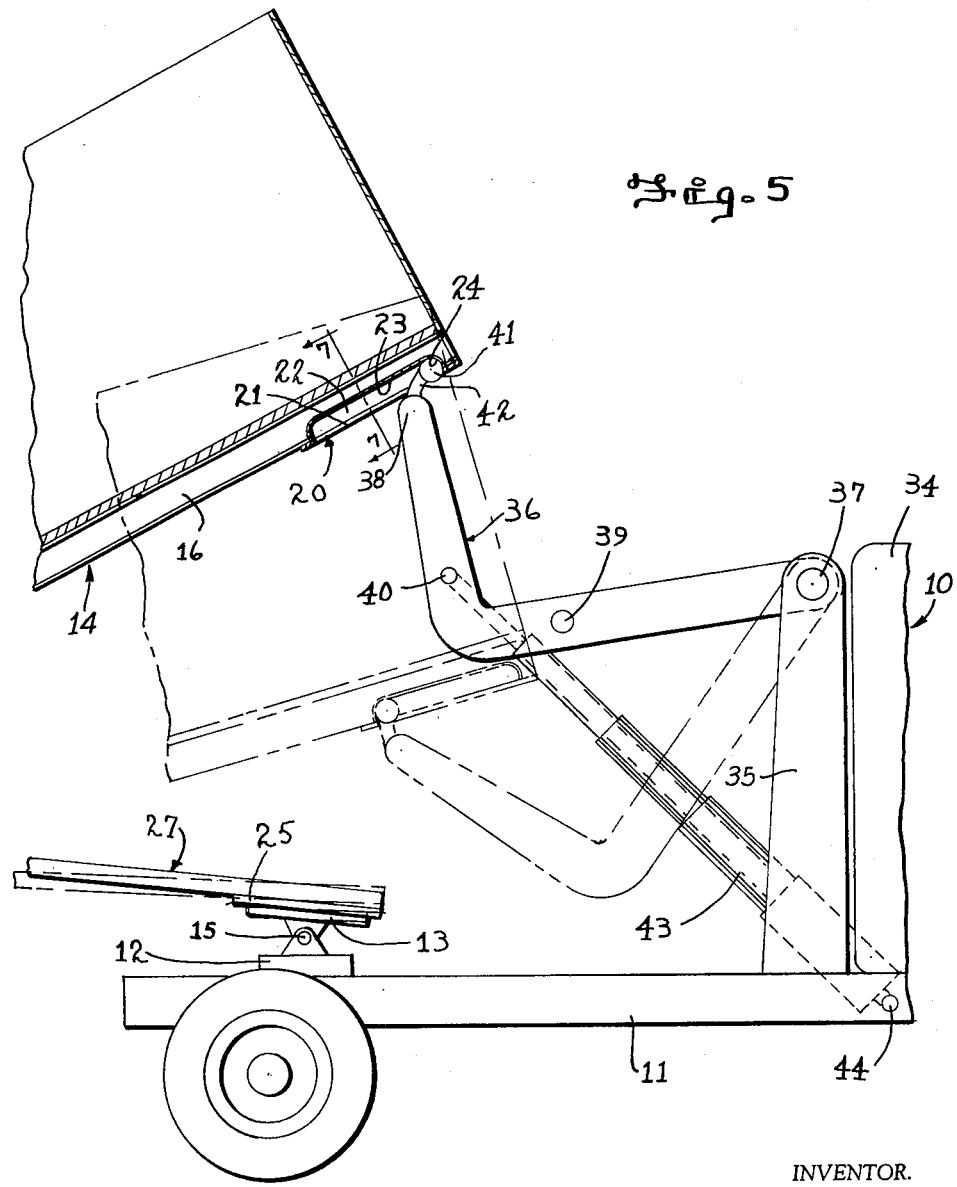

Sept. 22, 1964 J. P. FELBURN 3,149,881
TRACTOR TRAILER DUMPING VEHICLE
Filed July 9, 1958 8 Sheets-Sheet 1
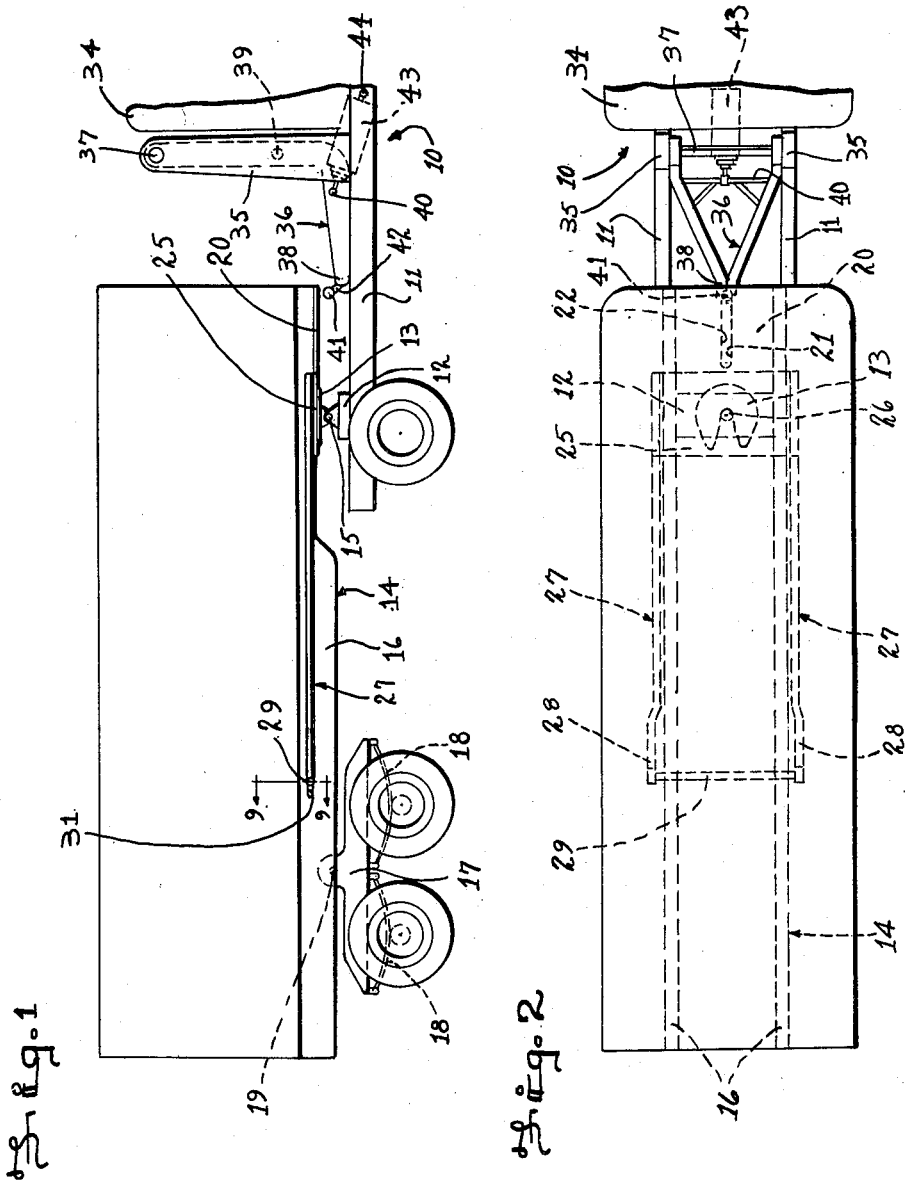
INVENTOR.
John Phil Felburn
BY
Attorney Sept. 22, 1964   J. P. FELBURN   3,149,881
TRACTOR TRAILER DUMPING VEHICLE
Filed July 9, 1958   8 Sheets-Sheet 2
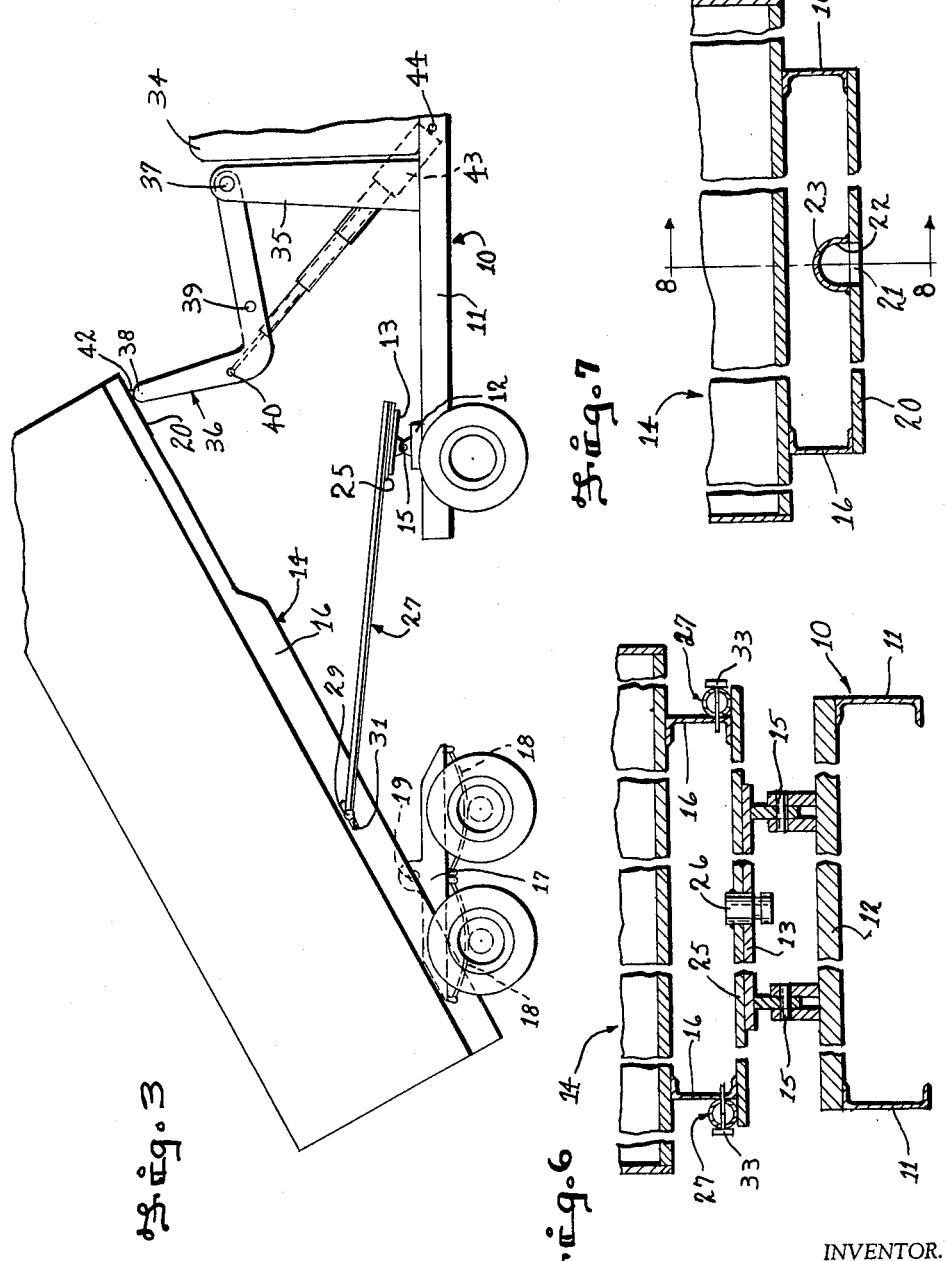
INVENTOR.
John Phil Felburn
BY
Attorney

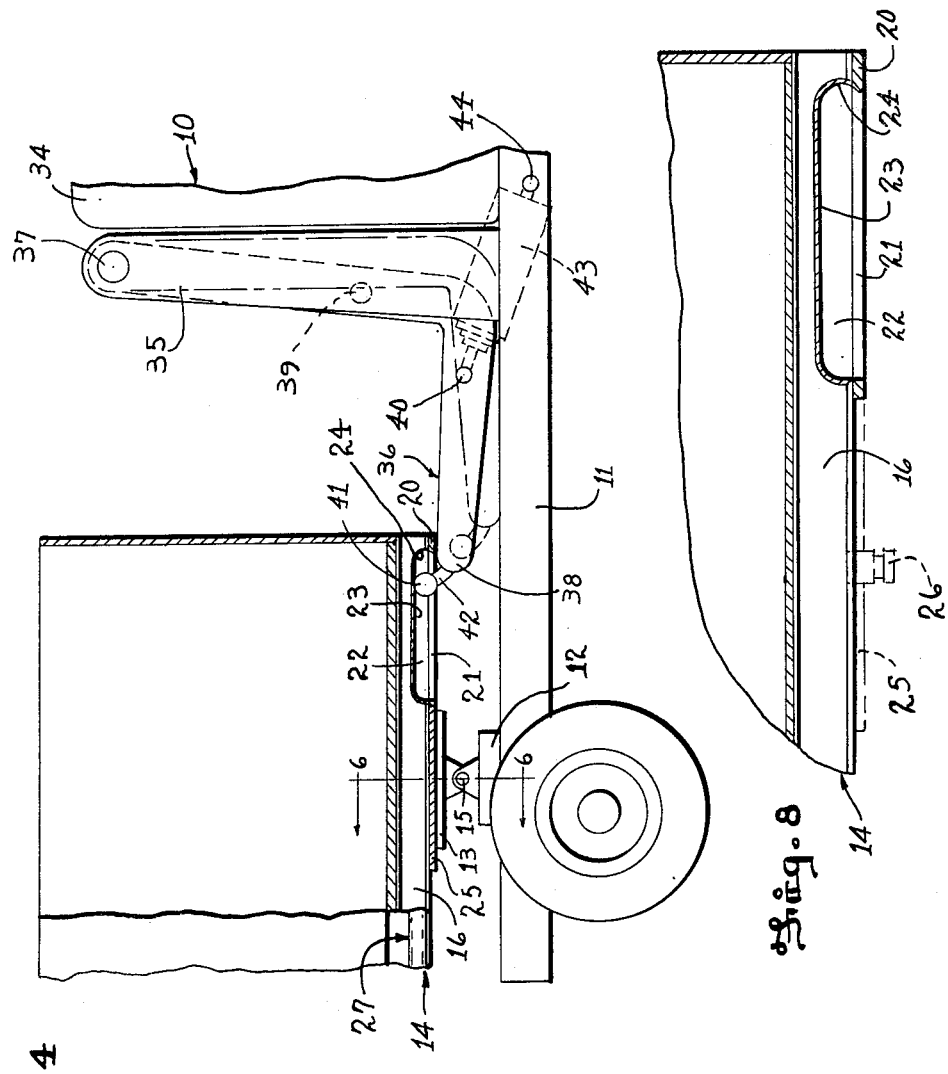

Sept. 22, 1964 J. P. FELBURN 3,149,881
TRACTOR TRAILER DUMPING VEHICLE
Filed July 9, 1958 8 Sheets-Sheet 4

INVENTOR.
John Phil Felburn
BY
Attorney

Sept. 22, 1964 J. P. FELBURN 3,149,881
TRACTOR TRAILER DUMPING VEHICLE
Filed July 9, 1958 8 Sheets-Sheet 5
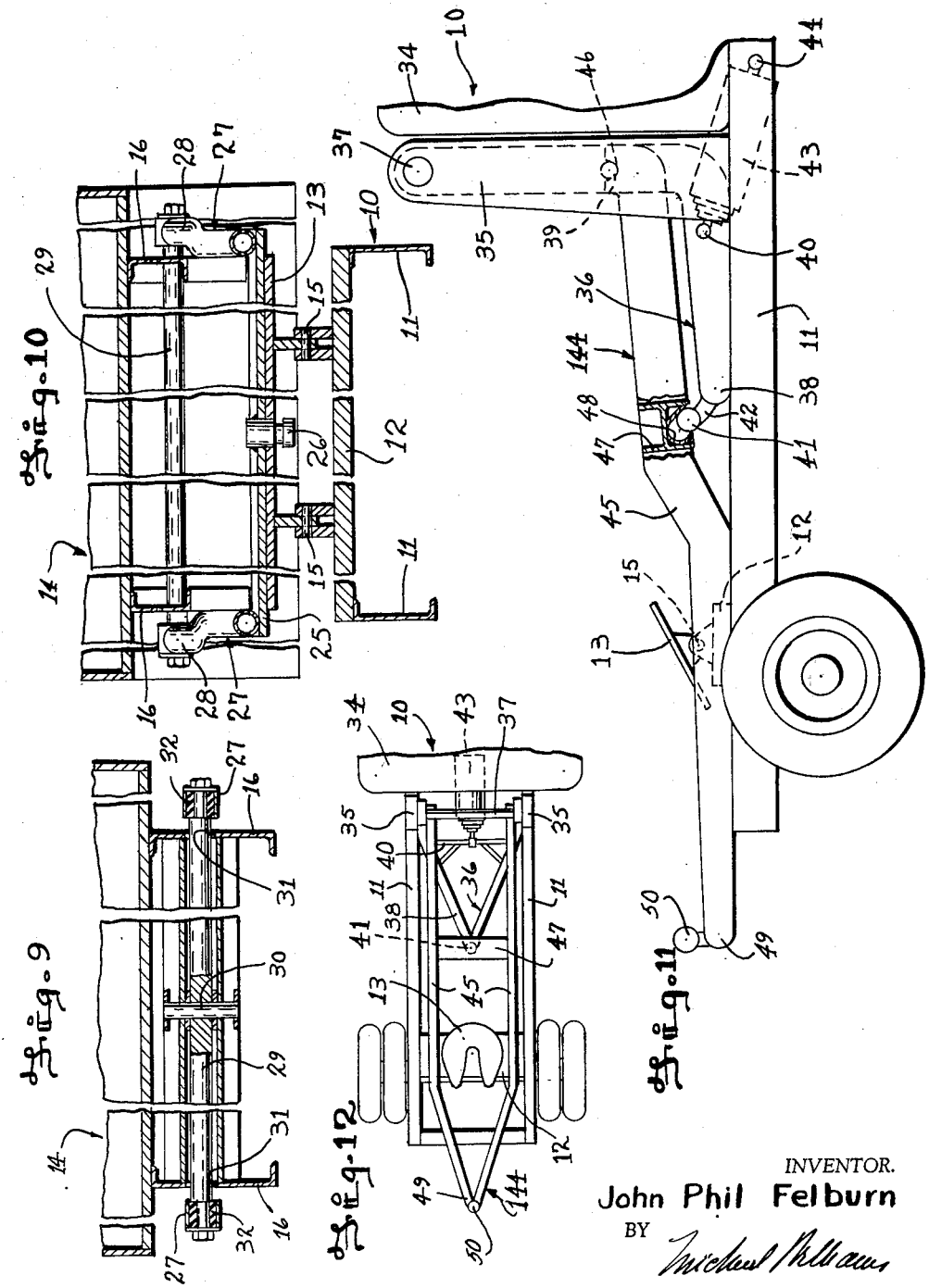
INVENTOR.
John Phil Felburn
BY
Attorney Sept. 22, 1964  J. P. FELBURN  3,149,881
TRACTOR TRAILER DUMPING VEHICLE
Filed July 9, 1958  8 Sheets-Sheet 6
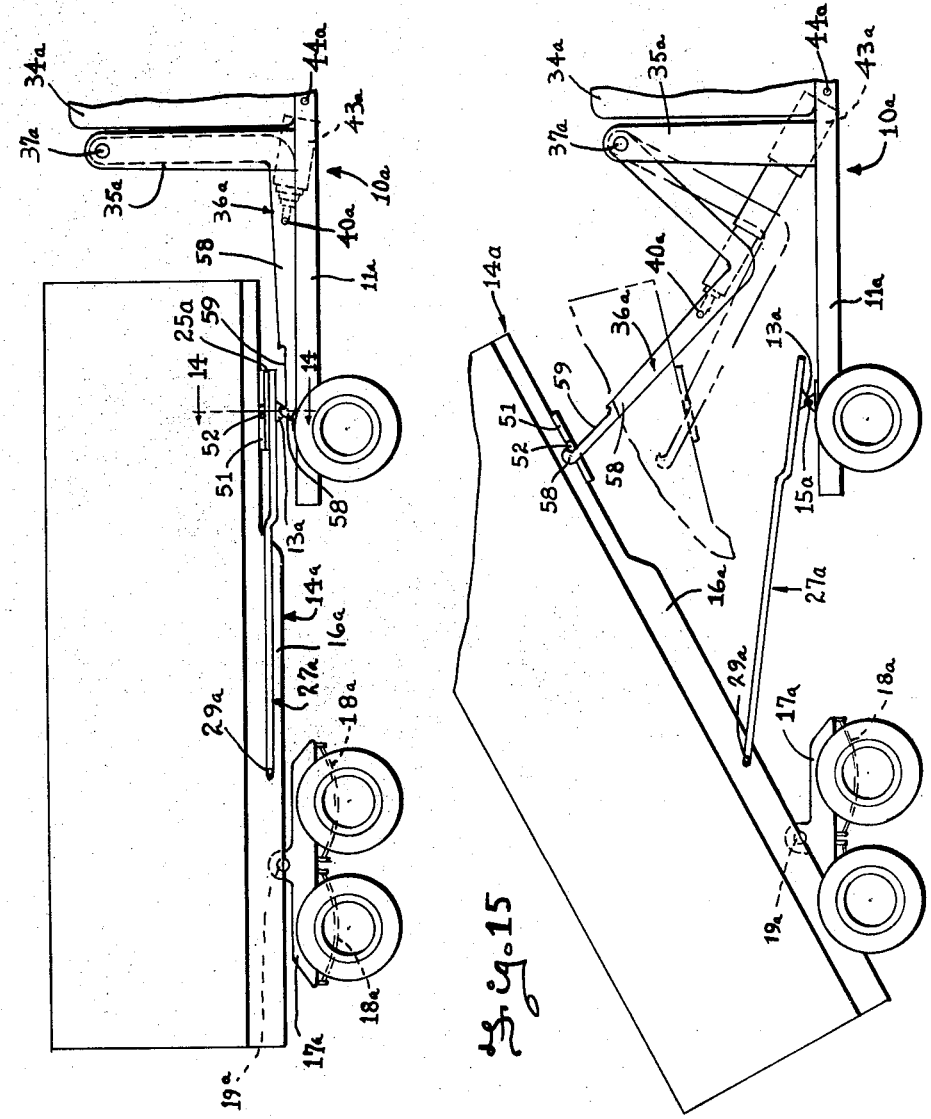
INVENTOR.
John Phil Felburn
BY
Attorney Sept. 22, 1964   J. P. FELBURN   3,149,881
TRACTOR TRAILER DUMPING VEHICLE
Filed July 9, 1958   8 Sheets-Sheet 7
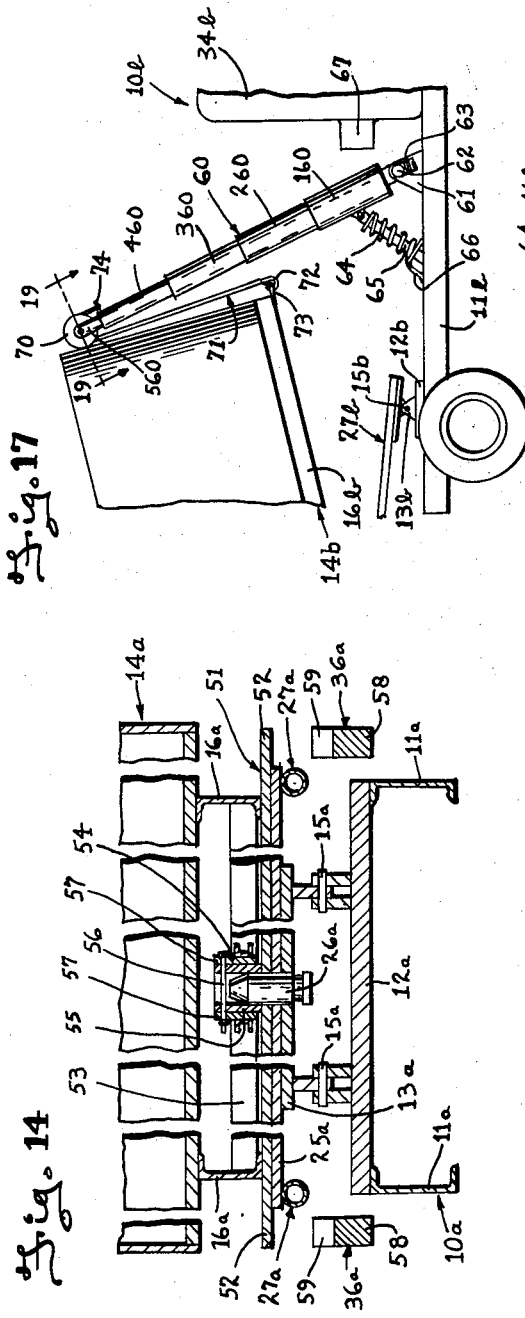
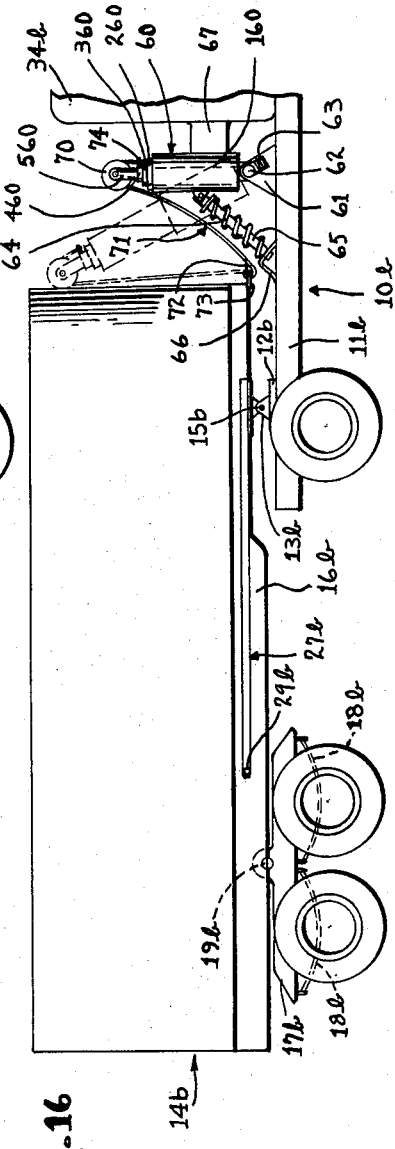
INVENTOR.
John Phil Felburn
BY
Attorney

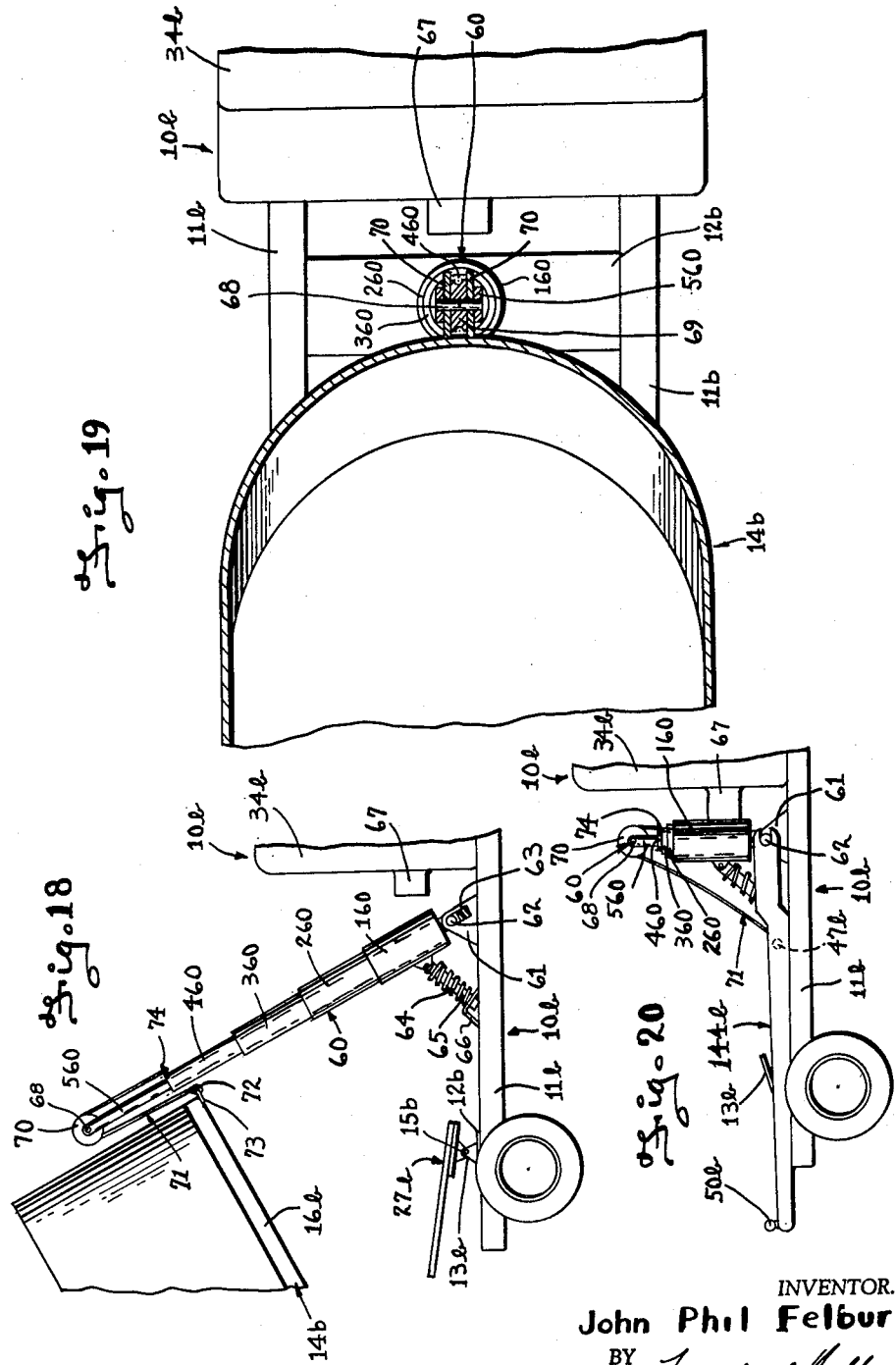

United States Patent Office

3,149,881
Patented Sept. 22, 1964

3,149,881
TRACTOR TRAILER DUMPING VEHICLE
John Phil Feiburn, Dayton, Ohio
(Dayton Municipal Airport, Vandalia, Ohio)
Filed July 9, 1958, Ser. No. 747,526
9 Claims. (Cl. 298—20)

The present invention relates to transportation vehicles, more particularly to vehicles of the semi-trailer, tractor type, and the principal object of the invention is to provide new and improved vehicles of such character.

Although the superiority and advantages of semi-trailer, tractor rigs over straight bed trucks have long been known, no practical arrangement has been heretofore devised whereby the load carried by the semi-trailer may be dumped by tilting the trailer bed. In certain prior art constructions, there was provided a trailer frame to which a dump bed was pivotally attached. This, however, has the disadvantage of excessive weight because of the necessity of having a supporting frame for the dump bed in addition to the normal trailer frame. Furthermore, such trailers are of special construction and their price is accordingly high. This is particularly true where, as in the usual construction, the trailer incorporates the lifting mechanism.

In other prior art constructions a more or less conventionally constructed trailer is employed. In these constructions, the lifting mechanism is usually carried by the tractor and such lifting mechanism usually lifts the fifth wheel, upon which the trailer rests, to elevate the trailer. While this construction eliminates certain of the disadvantages hereinabove mentioned, it introduces other undesirable features. Not the least of these undesirable features is the fact that with the trailer elevated, a highly unstable condition exists. Thus, it is dangerous to move the rig while the trailer is elevated, particularly when it is loaded, since it is easily possible to upset both the tractor and the trailer.

The present invention provides a semi-trailer, tractor rig which is highly stable in either its normal transporting position or in its elevated dumping position. It further employs a semi-trailer which is so similar to ordinary, non-dumping trailers that the ordinary trailer may be readily converted for use with but slight, inexpensive modifications. These and other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a fragmentary, side elevational view of a semi-trailer, tractor rig embodying the present invention, FIGURE 2 is a plan view of the tractor-trailer rig seen in FIGURE 1, FIGURE 3 is a view similar to FIGURE 1 but with the trailer in its elevated, dumping position, FIGURE 4 is a fragmentary view similar to FIGURE 1 but enlarged and shown in a slightly different position and partially broken away on the near side to better illustrate the interior construction, FIGURE 5 is a view similar to FIGURE 4 but showing the trailer partially elevated in phantom lines and fully elevated in full lines.

FIGURE 6 is a further enlarged, fragmentary, broken sectional view generally corresponding to the line 6—6 of FIGURE 4, FIGURE 7 is an enlarged, fragmentary, broken sectional view generally corresponding to the line 7—7 of FIGURE 5, FIGURE 8 is a fragmentary sectional view generally corresponding to the line 8—8 of FIGURE 7.

FIGURE 9 is an enlarged, fragmentary, broken sectional view generally corresponding to the line 9—9 of FIGURE 1, FIGURE 10 is a view similar to FIGURE 6 but with the trailer slightly elevated, FIGURE 11 is a side elevational view similar to FIGURE 4 but showing the tractor unit without the trailer unit and illustrating the use of an extension device with the tractor, and FIGURE 12 is a reduced size plan view of the tractor unit and extension device seen in FIGURE 11, FIGURE 13 is a view similar to FIGURE 1 but of another embodiment of the invention, FIGURE 14 is an enlarged sectional view generally corresponding to the line 14—14 of FIGURE 13, FIGURE 15 is a view similar to FIGURE 13 but illustrating the trailer of this embodiment in its elevated, dumping position, FIGURE 16 is a view similar to FIGURES 1 and 13 but of still another embodiment of the invention, FIGURE 17 is a fragmentary view similar to FIGURE 16 but showing the trailer of this embodiment in a partially elevated position, FIGURE 18 is a view similar to FIGURE 17 but showing the trailer in a fully elevated position, FIGURE 19 is an enlarged fragmentary sectional view generally corresponding to the line 19—19 of FIGURE 17, and FIGURE 20 is a view similar to FIGURE 16 but showing the tractor unit without the trailer unit and illustrating the use of an extension device with the tractor.

With reference to FIGURE 1, there is shown a draft unit such as a conventional tractor 10 of the type commonly in use to draw semi-trailers. Suitably secured across spaced-apart frame members 11 of the tractor is a suitable cross-member 12 upon which is mounted the usual fifth wheel 13 to which a semi-trailer 14 is adapted to be removably secured. The fifth wheel, in the present embodiment, is preferably mounted slightly ahead of the rear wheels of the tractor and as in the usual construction, the fifth wheel is pivotable about the aligned axes of pins 15 which extend generally horizontally in a direction transverse to the longitudinal axis of the tractor to provide for articulation of the tractor and its attached trailer when rough surfaces are being traversed. As in conventional constructions, trailer 14 is adapted to be supported by the fifth wheel in a manner to be seen for pivotal movement about a generally vertical axis to provide for maneuverability when negotiating turns or curves.

In the usual semi-trailer construction, the forward trailer portion has a plate fixedly attached to the underside of the trailer frame which is adapted to overlie and rest upon the fifth wheel carried by the tractor. Fixedly carried by the above mentioned plate and depending therefrom is a generally vertically disposed king pin which engages with the fifth wheel of the tractor and provides a pivot about which the tractor and trailer are relatively shiftable. The present invention, although similarly constructed, differs from the foregoing construction in several important respects as will appear.

As best seen in FIGURES 1 and 2, semi-trailer 14 has a pair of longitudinally extending frame members 16 in side by side spaced relation which form the backbone of the trailer. The rear portion of the trailer carries road engaging wheels and in the present embodiment, tandem wheels are herein shown connected to a subframe 17 by means of springs 18. For a purpose to be seen, subframe 17 is preferably pivotally connected to frame members 16 by a suitable pivot 19.

Turning now to the forward trailer portion and as may be seen in FIGURES 1, 7 and 8, a plate 20 extends across the frame members and is welded or otherwise affixed to the underside thereof. For a purpose to appear, plate 20 has a longitudinally extending slot 21 positioned intermediate frame members 16. Overlying slot 21 and forming what may be described as an inverted trough 22 is a member 23 which is welded or otherwise secured to plate 20. It will be noted from a study of FIGURE 7 that the bottom of inverted trough 22 is preferably semi-spherical in cross-section to closely fit with a ball later to be described. It will also be noted that the forward trough portion 24 (see FIGURE 8) is also semi-spherical for reasons later to appear.

In the position of parts seen in FIGURES 1, 2, 4 and 6, a plate 25 is disposed immediately behind plate 20 and in abutting relation therewith. In this position of parts, plate 25 rests against the underside of trailer frame members 16 in a manner similar to plate 20; however, plate 25 is not welded to the frame members but is shiftable toward and away therefrom in a manner to be described.

As best seen in FIGURE 6, plate 25 is adapted to overlie the fifth wheel 13 carried by the tractor and, welded or otherwise affixed to plate 25 and depending therefrom, is a conventional king pin 26 which cooperates in the usual way with fifth wheel to provide a generally vertical pivot about which respective longitudinal axes of the tractor and the semi-trailer are relatively shiftable. Although not shown, the fifth wheel will carry the usual latching mechanism for removably retaining the king pin in assembled relation therewith.

Still referring to FIGURE 6, it will be seen that plate 25 is of a size to extend beyond respective trailer frame members 16 and to such extending plate portions are welded or otherwise secured respective arms 27. These arms are herein shown to be tubular and each extends from the plate and along respective frame members 16 toward the rear of the trailer. In the present embodiment, arms 27 terminate short of the rear of the trailer and, for a purpose to be seen, each has its rear terminal portion 28 (see FIGURE 2) bent outwardly so that such portions are spaced somewhat from respective frame members.

Disposed intermediate respective ends of the trailer and preferably at a point some little distance ahead of pivot 19 is a cross bar 29 which extends transversely of the trailer and is swingable, for a purpose later to be disclosed, about a generally vertical shaft 30 (see FIGURE 9) carried by the trailer. Cross bar 29 is of a length to extend beyond respesctive trailer frame members 16, the latter being provided with respective elongated apertures 31 for passing respective ends of the cross bar, and the rear terminal ends of arms 27 are adapted to be pivotally secured to respective ends of cross bar 29 by any suitable means. For purposes of flexibility, it is preferable to interpose suitable resilient bushings 32 of rubber or the like between the cross bar and respective ends of arms 27. It will now be clear that by means of arms 27 and cross bar 29, plate 25 and the trailer are pivotally secured together for relative vertical movement.

Under certain circumstances, such as when the tractor is to be disconnected from the trailer thus leaving the forward trailer portion supported by the usual landing gear (not shown), it may be desirable to lock plate 25 against downward movement away from the trailer frame. At such times and as seen in FIGURE 6, pins 33 may be passed through aligned apertures provided in respective arms 27 and their adjoining frame members 16. It is to be understood that the use of the pins 33 passed through apertures is illustrative only and that any other suitable construction may be employed to accomplish this purpose.

With the semi-trailer secured to the tractor in normal draft position as seen in FIGURE 1, it will be clear that the forward portion of the trailer rests upon plate 25 which in turn rests upon fifth wheel 13. The king pin 26, since it is at this time secured to the fifth wheel, maintains the plate 25 assembled with the latter. Any fore and aft thrust forces between the tractor and the trailer which may arise when the tractor is accelerating or decelerating, will be transmitted through king pin 26 and plate 25 to the frame of the trailer through arms 27. Moreover, since the forward margin of plate 25 abuts plate 20 which is welded to the trailer frame, interengagement therebetween will prevent movement of plate 25 in a forward direction relative to the trailer even though, for some reason, arms 27 would fail to hold the plate in opposition longitudinally of the trailer. Additionally, although not shown, an abutment could, if desired, be welded to the underside of the trailer frame members 16 in abutting relation with the rear margin of plate 25 to insure its immobility on the opposite direction. Immobility of plate 25 relative to the trailer in a direction from side to side thereof is insured by virtue of the fact that the arms 27, whose forward ends are welded to plate 25, lie closely against the outside of respective trailer frame members 16 as is readily seen in FIGURE 6.

With reference now to the tractor 10, such tractor provides means for elevating the front portion of the trailer for dumping the latter's load. In the presently disclosed embodiment, there is secured to the tractor frame 11, immediately behind the cab 34 of the tractor, a pair of spaced-apart, upright support members 35 (see FIGURES 1 and 2). Secured between members 35 are a pair of rearwardly facing, L-shaped lift members 36 which are pivotally connected to the members by means of a pivot shaft 37 carried by said members adjacent their upper terminal portions.

The vertically extending leg of each L-shaped member 36 is preferably disposed adjacent a respective upright member 35 while the horizontally disposed legs of the L-shaped members are arranged in converging relation with their free ends joined together at 38. For a purpose to be seen, a cross-member 39 connects the vertically disposed legs of the L-shaped members while a cross-member 40 connects their horizontally disposed legs. If additional rigidity is required, other cross-members or bracing struts may be advantageously employed as will be understood.

Still referring to FIGURES 1 and 2 but as may also be seen in FIGURE 4, the joined ends 38 of L-shaped arms 36 carry a ball 41 which is rigidly attached to the arms by means of a gooseneck connecting member 42. A fluid cylinder 43 of the telescoping type has its piston rod pivotally connected to cross-member 40 of L-shaped arms 36 and its opposite end pivotally connected at 44 to the frame of the tractor. This fluid cylinder will be connected by suitable conduits (not shown) to any conventional source of fluid under pressure (such as a pump driven by the tractor engine) so that it may be extended and retracted as required.

With the semi-trailer connected to the tractor as seen in FIGURE 1, the trailer may readily be elevated to the position seen in FIGURE 3 by admitting fluid under pressure to cylinder 43 in manner to extend the latter. This rotates the L-shaped lift members in a clockwise direction to engagement with the forward portion of the semi-trailer so as to lift the latter.

As seen in FIGURE 4, initial extension of cylinder 43 will rotate the lift arms from their normal phantom line position to their full line position. This raises ball 41 which passes through slot 21 in plate 20 to seated relation with the bottom of inverted trough 22 adjacent the latter's forward end. Continued extension of cylinder 43 effects continued rotation of lift members 36 to progressively lift the forward portion of the trailer off plate 25 (which remains attached to the fifth wheel through the king pin 26) through the phantom line, intermediate position seen in FIGURE 5 to the full line, maximum lift position shown therein.

Note that during the initial stages of elevation of the trailer, ball 41 progresses rearwardly of trough 22 from the position shown in full lines in FIGURE 4 to the phantom line position shown in FIGURE 5 and during the later stages of elevation of the trailer, ball 41 progresses forwardly from the phantom line position shown in FIGURE 5 to the full line position shown wherein the ball is seated in the forward trough portion 24. This movement of the ball occurs because the forward portion of the trailer moves upwardly in very nearly a straight line (in the later stages of its movement it actually curves very slightly to the rear) while the ball, moving in an arcuate path about pivot shaft 37, first swings rearwardly as it approaches the level of such pivot shaft and with further movement thereafter swings forwardly.

It is an important feature of the invention that arms 27, being pivotally secured to the trailer by means of cross-bar 29 and being pivotally secured to the tractor by means of the pivotally mounted fifth wheel 13, function as a link for maintaining the tractor and trailer in predetermined relation while the latter is elevated. Accordingly, the tractor may be driven while the trailer is elevated when, for example, it is desired to spread the load carried by the trailer, without danger of upsetting the rig. This results because any push or pull between the tractor and trailer is transmitted through the connecting link formed by the arms above mentioned and since such link connection has been elevated but only a negligible amount, very little loss of stability occurs. This is in direct contrast to prior art constructions of the so-called high lift fifth wheel type wherein the only connection between the tractor and trailer during elevation of the latter is provided by the greatly elevated fifth wheel.

It will be recalled that the cross-bar 29 to which arms 27 are pivotally connected, is itself pivotable about the axis of a shaft 30. This construction permits displacement of the longitudinal axes of the tractor and trailer in the same manner as though the latter were not elevated and without stressing either arms 27 and their associated parts or lift members 36 and their associated parts to thus provide greater maneuverability than is possible if the axes aforesaid cannot be so displaced. Note that the relatively wide spacing of arms 27 at 28 adjacent cross-bar 29 obviates interference between such arms and the trailer frame members during normal maneuvering.

When it is desired to lower the trailer from its elevated position, it is only necessary to release the fluid pressure holding cylinder 43 in extended relation. The weight of the trailer will then usually be adequate to collapse the cylinder by causing lift members 36 to rotate in a counterclockwise direction to the phantom line position seen in FIGURE 1. It will be understood that the trailer frame members 16 will readily return to seated relation upon plate 25, since, as shown in FIGURE 10, the facing sides of arms 27, being arcuate, function as converging guide surfaces to guide the frame members therebetween to seated relation.

Whenever it is desired to withdraw the tractor from beneath the trailer, it will be necessary to prevent the plate 25 from dropping away from its position underlying the trailer frame members. This may readily be accomplished by positioning the previously mentioned pins 33 as seen in FIGURE 6. Obviously, when the trailer is connected to the tractor as heretofore described, the pins are unnecessary since the weight of the trailer will maintain the latter upon plate 25. If desired, however, the pins may be retained in position for safety purposes. When the trailer is to be elevated, the pins must be removed to permit the trailer to be lifted from its position upon plate 25. Accordingly, in the usual course of events, pins 33 will be employed as seen in FIGURE 6 only when the tractor is to be disconnected from the trailer.

With reference now to FIGURES 11 and 12, an extension 144 is adapted to be used with the lift members 36 of the tractor to provide a hoist for lifting a trailer, or indeed other objects, without the necessity of requiring that the trailer be first attached to the fifth wheel of the tractor. This may be used to considerable advantage when a trailer is to be disposed upon a railroad car in a combined road-rail, integrated transport system.

By way of illustration, the rear of a trailer may be disposed upon a railroad car by its transporting tractor in the manner disclosed in my co-pending application for Letters Patent, Serial No. 600,528, filed July 27, 1956, for "Running Gear for Trailer Assembly," now abandoned. The forward portion of the trailer may then be engaged by the extension device carried by a tractor having the lift construction herein described for support thereby, and the wheels of the trailer and its transporting tractor then removed in the manner disclosed in the above mentioned application. Thereafter, the tractor having the lift device which is at this time supporting the forward portion of the trailer, may be maneuvered to shift the trailer to proper position for transport upon the railroad car. The foregoing procedure will be reversed when a trailer is to be removed from the railroad car and connected to a tractor for transport over the highway.

As seen in FIGURES 11 and 12, extension 144 comprises a pair of elongated members 45 spaced to closely fit between the vertically extending leg portions of the L-shaped lift members 36. The forward portions of members 45 engage beneath the cross-member 39 which connects the vertically disposed legs of lift members 36 and such forward portions are preferably formed to provide upwardly facing pockets 46 for receiving such cross-member.

Extending between and connecting intermediate portions of members 45 is a cross-member 47 having a downwardly facing pocket 48 for closely receiving the ball 41 carried by the lift members. Members 45 preferably extend rearwardly beyond the end of the tractor and such member portions are preferably arranged in converging relation with their free ends joined together at 49 in a manner similar to members 36. In the present embodiment, the joined portions 49 of members 45 carry a ball 50 which may be similar to the ball 41 carried by members 36.

In operation and with the trailer disconnected from the tractor, extension 144 will be disposed upon a tractor as seen in FIGURES 11 and 12. In order to elevate a trailer, ball 50 need only be disposed beneath and in alignment with trough 22 provided in the trailer and the lift arms 36 then rotated up by means of fluid cylinder 43 to first engage ball 41 in pocket 48 of the extension member and to thereafter lift the extension member to engage its ball in the trough and upon continued movement to thus lift the forward end of the trailer. The latter may then be maneuvered as desired by proper manipulation of the tractor as will readily be seen. By the use of extension 144, the need for a single purpose lift truck or the like is thus eliminated since any tractor having the lift arms 36 may be employed for this purpose.

When extension member 144 is no longer needed and it is desired to connect the tractor upon which it is mounted to a trailer in the manner shown in FIGURE 1, it is only necessary to unhook the extension member from the tractor and to lift it off whereupon the tractor may readily be connected to the trailer in the manner previously described. While extension 144 has been disclosed for use only in elevating a trailer, it will be understood that a suitable chain or the like may be secured thereto to permit use of the device as a hoist for lifting other objects.

In the embodiment of the invention seen in FIGURE 13, parts similar to those heretofore disclosed are identified with the same reference characters but with the suffix "a" added. In this embodiment, the slot at the forward end of the trailer has been eliminated and instead the following construction is employed:

As best seen in FIGURE 14, a plate 51 underlies frame members 16a and is interposed between the latter and the plate 25a to which the arms 27a are attached. Plate 51 may be generally round although it will have diametrically opposed, radially extending ears 52 projecting therefrom for a purpose to appear.

Plate 51 may be rotatably secured to the frame of the trailer concentric with the axis of the king pin 26a by any suitable means; however, at the present time the following construction is preferred. A suitable supporting structure 53 is welded to the frame member 16a and welded to such structure is a tubular member 54. Rotatably fitting within member 54 is a tubular member 55 whose lower end is welded to plate 51 and whose upper end extends above tubular member 54. A suitable bolt 56 extends through aligned apertures at the upper end of tubular member 55 and carried by the bolt are slide blocks 57 which bear against the upper margin of member 54 to maintain member 55 within member 54.

The inside diameter of tubular member 55 is such that it slidably receives the upper end of the king pin 26a, the latter being elongated for this purpose and preferably having a conical upper end to facilitate its entry therewithin. From the foregoing, it will be evident that plate 51 is pivotally secured to the underside of the trailer frame directly above the fifth wheel king pin and that plate 25a, to which the king pin and also arms 27a are secured, underlies and bears against the underside of plate 51.

In the position of parts seen in FIGURES 13 and 14, the trailer is in its lowermost position resting upon the rear of the tractor so that it may be drawn thereby in the manner of a conventional, non-dumping trailer. In such position, the trailer pivots upon the fifth wheel about the axis of the king pin in the usual manner. During such pivotal movement, plate 51 does not rotate relative to the trailer but merely turns therewith.

The means provided for elevating the trailer shown in FIGURE 13 is somewhat similar to that provided heretofore and comprises a lift member 36a. This lift member, however, differs from the preceding embodiment in that the horizontally disposed legs thereof are somewhat longer and are not disposed in converging relation. Instead, the rear portions 58 of such legs are bent outwardly for disposition outside the tractor frame and in underlying relation with the ears 52 of plate 51. As best seen in FIGURES 13 and 15, the upper side of each rear leg portion 58 of lift member 36a is provided with an elongated notch 59 for a purpose to be seen.

In order to lift the trailer to dump its contents, it is only necessary to rotate the lift member 36a by means of the fluid cylinder as previously described. Initial rotation of the lift member will engage notch 59 with respective plate ears 52 and continued rotation thereof will lift plate 51, together with the forward end of the trailer, from plate 25a which remains attached to the fifth wheel as described in the previously disclosed embodiment.

With the trailer elevated to its full lift position as seen in full lines in FIGURE 15 (or indeed to any position intermediate its full lift position and its full down position seen in FIGURE 13), it will be understood that when the tractor is maneuvered to dispose its longitudinal axis at an angle with the longitudinal axis of the trailer, plate 51 will readily rotate with the lift member and relative to the trailer so that its ears remain in the notches formed in the lift member. Since the lift arm of the tractor is connected to the trailer through the medium of the pivotally mounted plate 51 as above described, there will be no necessity to provide for pivotal movement of the cross bar 29a to which the rear portions of arms 27a are secured. Accordingly, the pivot for cross bar 27a may be eliminated as well as the elongated apertures in the trailer frame members which provided clearance for such pivotal movement of the cross bar.

In the embodiment of the invention seen in FIGURES 16 through 20 wherein parts similar to those hereinbefore described are identified with the same reference characters but with the suffix "b" added, the construction has been considerably simplified by eliminating the lift arms and the eared plate 51 together with their respective associated parts. Instead, there is provided a telescoping lift cylinder 60 which projects upwardly from and which is pivotally secured to the frame 11b of the tractor 10b by suitable brackets 61. Any suitable arrangement may be provided to permit limited tilting of cylinder 60 from side to side of the tractor and in the present embodiment, respective ends of the shaft 62 about which the cylinder is pivoted are movable vertically in slots formed in respective brackets. Suitable springs 63 resiliently maintain both ends of shaft 62 at the upper end of respective slots.

Means are also provided for resiliently urging cylinder 60 to the position seen in FIGURE 16, such means presently comprising a compression spring 64 through the center of which extends a rod 65 whose upper end is pivoted to a suitable bracket carried by the cylinder. The upper end of spring 64 bears against a suitable shoulder formed on the rod and the lower end bears against a bracket 66 carried by the tractor frame. The lower end of rod 65 is slidably supported by bracket 66 in any suitable manner, such as by forming the bracket with an oversize aperture through which the rod passes. Any suitable abutment 67 may be carried by the tractor to provide a stop for limiting movement of the cylinder under the impetus of the spring 64.

As previously mentioned, cylinder 60 is of the telescoping type and in the present embodiment comprises a base section 160, a first section 260, a second section 360, a third section 460 and a fourth section 560. The upper end of the terminal section (in this case the fourth section 560) carries a transverse pin 68 upon which is rotatable a sheave 69 (see FIGURE 19). Also rotatable upon pin 68 but independently of sheave 69 are two disks 70, each disposed on a respective side of the sheave, for purpose to appear.

Extending over sheave 69 is the intermediate portion of a suitable cable 71 whose one end carries a hook 72 removably securable to a bracket 73 at the forward end of the trailer. The opposite end of cable 71 is, in the present embodiment, anchored at 74 in any suitable manner to the upper end of the intermediate cylinder section 460 for movement therewith.

With cylinder 60 collapsed as seen in FIGURE 16, the trailer will be supported upon the tractor in position to be drawn thereby in the usual manner. Note that spring 64 will maintain the cylinder in upright position against the abutment 67. Note also that hook 72 of cable 71 is attached to the trailer bracket 73 and that there is preferably a certain amount of slack in the cable at this time and to facilitate fastening and unfastening of the cable with the trailer. When the tractor turns sharply, a pull will be exerted on the cylinder thus drawing it away from its abutment 67 and against the force exerted by spring 64; however, as soon as the turn has been completed, the cylinder will be returned to the position seen in FIGURE 16 by the spring. Accordingly, it will be understood that while the cable will preferably remain attached to the trailer at all times and while but little slack is provided therein, there will be no interference with pivotal movement of the trailer about the king pin axis since the cylinder will readily rotate about the axis of shaft 62 and against the force exerted by spring 64.

Still referring to FIGURE 16, when it is desired to elevate the front of the trailer to dump its contents, fluid under pressure will be admitted to cylinder 60. This will cause extension of the cylinder sections 260, 360, 460 and 560 in the following manner: First, cylinder section 260 will move out of the base section 160 the full length of its stroke (carrying sections 360, 460 and 560 with it, of course). When section 260 has reached the limit of its stroke, section 360 will move out of section 260 until it too reaches the end of its stroke whereupon the section 460 will start its extension. Upon section 460 reaching the end of its stroke, section 560 will start its extensible movement. From the foregoing, it will be clear that extensible movement of the cylinder sections takes place in succession, beginning with the lowermost and outermost section. Obviously, as a lower section moves out, it carries with it all of the sections thereabove.

As fluid under pressure is admitted to the cylinder 60, the sections thereof will move outwardly and upwardly as above described. Initial movement of the sections will first take up the slack in cable 71 and continued movement thereafter will cause the cylinder to rotate about pin 62 and against the force exerted by spring 64 until the disks 70 of cylinder section 560 engage the front of the trailer as shown in phantom lines in FIGURE 16. Continued application of fluid pressure to the cylinder will cause continued extension thereof to thereafter lift the front of the trailer by means of the cable 71.

In the position of parts viewed in FIGURE 17, the sections 260, 360 and 460 have moved to the ends of their stroke to thus partially elevate the trailer. Note that in moving to the position seen in FIGURE 17 from the phantom line position seen in FIGURE 16, the cable has not been drawn over the sheave 69; accordingly, the cylinder has imparted a direct lift to the trailer. Stated another way, each inch of extension of the cylinder during this state of the operation has lifted the front of the trailer one inch. Note also that during this lift stage the upper end of the cylinder remains supported by its engagement with the trailer to thus reduce side stresses on the cylinder.

With the parts positioned as seen in FIGURE 17, continued application of fluid pressure to the cylinder will cause extension of the terminal cylinder member 560 thus forcing the sheave 69 upwardly. However, because the end of cable 71 is anchored at 74 to the cylinder section 460 which is, at this time, stationary by virtue of being at the end of its stroke, lifting of the trailer will occur in a somewhat different manner. As sheave 69 moves up one inch, for example, it will pull hook 72 up one inch; however, as the sheave also moves up one inch away from the anchor point 74 of the cable, it is necessary that the cable length on this side be increased. Since the only way the cable can be increased in length on this (the right) side is to transfer cable thereto from the left side, the cable will run from left to right through the sheave. Accordingly, each inch of elevation of the sheave at this stage will elevate the trailer a distance of two inches. This accelerated lifting of the trailer is highly desirable in that it reduces the time required for the operation and reduces the amount of cylinder stroke necessary to lift the trailer. This accelerated lifting is, at this time, particularly appropriate since, with the trailer partly elevated, its center of gravity has shifted rearwardly and has thus considerably reduced the amount of force required to complete the lifting operation.

As the trailer moves up under the upward extensible movement of terminal cylinder section 560, disks 70 will roll downwardly along the front of the trailer until such time as the arcuate movement of the trailer pulls the latter away from the rolls. With the terminal section 560 fully extended, as seen in FIGURE 18, the rolls will be spaced from the trailer as illustrated. This is accomplished by so locating the lower end of cylinder 60 that its axis, at maximum lift position, will be tangent to the arc about which the trailer is rotated. Note that in its full lift position, the cylinder is "balanced" in that there are no side thrusts whatsoever thereon.

If, after partially or fully elevating the trailer, it is desired to maneuver the rig, it will readily be apparent that the cylinder 60 will not interfere therewith since the latter will merely be tilted toward one side or the other by the side pull of the cable caused by turning of the trailer about the axis of its king pin. This tilting of the cylinder is provided for by the previously described arrangement of the cylinder support brackets 61. Moreover, since the front of the trailer is rounded (see FIGURE 19), there will be no corners to swing out into the path of the cylinder and thus interfere with turning of the trailer about its king pin.

As illustrated in FIGURE 20, an extension 144b, similar to extension 144 previously described, may be employed with the lift construction disclosed in FIGURES 16 through 19. In this embodiment however, the front end of the extension may conveniently fit with the cylinder pivot pin 62 which may be extended in either direction beyond brackets 61 for this purpose. Furthermore, a suitable cross member 47b may be provided to which the cable hook 72 will be attached so that extension of the cylinder will rotate the extension 144b about pin 62 and thus elevate the rear portion of the extension.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A transportation vehicle comprising a draft unit having a support at its rear end, an elongated trailer unit whose rear portion is supported by ground engaging wheels and whose forward portion is removably supported by and secured to said draft unit support for movement relative to said draft unit about a generally vertical axis to provide for displacement of the longitudinal axis of said trailer unit from the line of draft of said draft unit, a fluid cylinder having one end connected to said draft unit and its other end connected to the forward end of said trailer unit for elevating the latter for dumping purposes when said cylinder is extended, the connection of said cylinder with said draft unit including a horizontal pivot shaft extending in a direction from side to side of said draft unit and about which said cylinder is swingable in a direction from front to rear of said draft unit as said trailer unit is elevated and lowered, and means supporting said shaft for relative vertical movement of respective shaft ends to provide for tilting of said cylinder in a direction from side to side of said draft unit when said trailer unit is elevated and its longitudinal axis is displaced from the line of draft of said draft unit.

2. The construction of claim 1 wherein said shaft supporting means comprises a bracket structure carried by said draft unit and providing vertically elongated slots in which respective pivot shaft ends are disposed and wherein resilient means yieldably biases said pivot shaft ends to respective slot ends.

3. The construction of claim 2 wherein resilient means yieldably resists tilting of said cylinder about said pivot shaft axis.

4. A dumping vehicle comprising, a tractor unit provided with a fifth wheel plate adjacent the rear end thereof, a trailer unit having ground-engaging wheels disposed rearwardly of said tractor unit, said trailer unit having a body connected thereto by a transversely disposed pivotal connection adjacent the rear end of said body, a second fifth wheel plate cooperatively associated with said first named wheel plate, said second plate being secured to the front end of said body and providing for vertical swinging movement thereof about said pivotal connection, the said tractor and trailer units thereby conjointly supporting said body for transport thereof, a fluid cylinder elevating assembly carried by said tractor unit for tiltably elevating said body, said fluid cylinder assembly including a base section secured to said tractor unit for pivotal movement about a horizontal axis transversely thereof, a terminal section having an outer end, and at least one intermediate cylinder section therebetween, said sections fitting one within the other in telescoping relation when said cylinder assembly is in retracted position, means carried by said tractor unit for conducting fluid under pressure to said base section to extend said terminal and intermediate cylinder sections therefrom, the initial extending movement resulting in both said terminal and intermediate cylinder sections moving axially and simultaneously outwardly in unison from said base section until said intermediate cylinder section is substantially fully extended from said base section and with said terminal section still telescoped with said intermediate section, subsequent extending movement resulting in extension of said terminal section axially outwardly from said intermediate cylinder section, an elongated flexible member having one end secured to the front end of said body and its other end secured to said intermediate cylinder section at a point thereon spaced farthest from said base section when said intermediate cylinder section is extended therefrom, means carried by said outer end of said terminal section engaged with the intermediate portion of said flexible member between the ends thereof, said means providing for relative movement between said flexible member and said terminal section while remaining in engagement with said flexible member, whereby lifting action is imparted to said body at one lift ratio during unitary movement of both said terminal and intermediate cylinder sections outwardly from said base section, and imparting lifting action to said body at a different lift ratio during subsequent movement of said terminal section outwardly from said intermediate cylinder section to thereby pivot the body about said trailer unit horizontal pivot.

5. A two unit vehicle assembly comprising a draft unit having an upwardly facing fifth wheel plate at its rear end, a semi-trailer unit adapted to be drawn by said draft unit and having a downwardly facing fifth wheel plate at its forward end for resting upon said draft unit plate and said trailer unit being removably securable to said draft unit plate for movement relative to said draft unit about a generally vertical axis, trailer engageable means shiftably carried by said draft unit for projection beyond the rear end thereof and in one position being disposed beneath the level of said draft unit plate for non-interference with connection of said trailer unit to such plate, and means carried by said draft unit for elevating said trailer engageable means from said one position to engagement beneath the forward end of said trailer unit and for elevating and supporting the latter while it is being maneuvered about by said draft unit.

6. The construction of claim 5 wherein said trailer engageable means comprises a pair of arms in side by side relation pivoted to said draft unit forwardly of said draft unit plate and wherein said arms are spaced for disposition on opposite sides of said draft unit plate.

7. A vehicle for tiltably elevating a body, comprising a powered, wheeled factor, a fluid cylinder lifting assembly on said tractor, said fluid cylinder assembly including a base section secured to said tractor, a terminal including a base section secured to said tractor, a terminal section having an outer end, and at least one intermediate cylinder section therebetween, said sections fitting one within the other in telescoping relation when said cylinder assembly is in retracted position, means carried by said tractor for conducting fluid under pressure to said base section to extend said terminal and intermediate cylinder sections therefrom, the initial extending movement resulting in both said terminal and intermediate cylinder sections moving axially and simultaneously outwardly in unison from said base section until said intermediate cylinder section is substantially fully extended from said base section and with said terminal section still telescoped within said intermediate section, subsequent extending movement resulting in extension of said terminal section axially outwardly from said intermediate cylinder section, an elongated flexible member having one end securable to the front end of said body and its other end secured to said intermediate cylinder section at a point thereon spaced farthest from said base section when said intermediate cylinder section is extended therefrom, means carried by said outer end of said terminal section engaged with the intermediate portion of said flexible member between the ends thereof, said means providing for relative movement between said flexible member and said terminal section while remaining in engagement with said flexible member, whereby when said tractor is positioned adjacent said body, said one end of said flexible member is connected to the front end of said body, a lifting action is imparted to said body at one lift ratio during unitary movement of both said terminal and intermediate cylinder sections outwardly from said base section, and imparting further lifting action to said body at a different lift ratio during subsequent movement of said terminal section outwardly from said intermediate cylinder section to thereby tiltably elevate the body about the rear end thereof.

8. A lifting mechanism for a body, comprising an extensible-retractable fluid cylinder assembly including a base section securable to a support, a terminal section having an outer end, and at least one intermediate cylinder section therebetween, said sections fitting one within the other in telescoping relation when said cylinder assembly is in retracted position, means for conducting fluid under pressure to said base section to extend said terminal and intermediate cylinder sections therefrom, the initial extending movement resulting in both said terminal and intermediate cylinder sections moving axially and simultaneously outwardly in unison from said base section until said intermediate cylinder section is substantially fully extended from said base section and with said terminal section still telescoped with said intermediate section, subsequent extending movement resulting in extension of said terminal section axially outwardly from said intermediate cylinder section, an elongated flexible member having one end securable to said body to be lifted and its other end secured to said intermediate cylinder section at a point thereon spaced farthest from said base section when said intermediate cylinder section is extended therefrom, means carried by said outer end of said terminal section engaged with the intermediate portion of said flexible member between the ends thereof, said means providing for relative movement between said flexible member and said terminal section while remaining in engagement with said flexible member, whereby lifting action is imparted to said body at one lift ratio during unitary movement of both said terminal and intermediate cylinder sections outwardly from said base section, and imparting lifting action to said body at a different lift ratio during subsequent movement of said terminal section outwardly from said intermediate cylinder section.

9. The construction of claim 8 wherein said flexible member is a cable and said means carried by the outer end of said terminal section comprises a sheave rotatably mounted thereon, wherein said cable is trained over said sheave.

(References on following page)

References Cited in the file of this patent

UNITED STATES PATENTS

| | | |
|---|---|---|
| 1,334,730 | Avery | Mar. 23, 1920 |
| 1,424,424 | Spencer | Aug. 1, 1922 |
| 1,523,249 | Blum | Jan. 13, 1925 |
| 1,588,396 | Winn | June 8, 1926 |
| 1,728,460 | Weber et al. | Sept. 17, 1929 |
| 1,970,627 | Rubini et al. | Aug. 21, 1934 |
| 2,018,838 | Connors | Oct. 29, 1935 |
| 2,043,507 | Culmeyer | June 9, 1936 |
| 2,166,722 | Kirksey | July 18, 1939 |
| 2,459,506 | Demster | Jan. 18, 1949 |
| 2,543,210 | Wagstaff | Feb. 27, 1951 |
| 2,555,406 | Golay | June 5, 1951 |
| 2,565,730 | Johnson et al. | Aug. 28, 1951 |
| 2,661,236 | Schonrock | Dec. 1, 1953 |
| 2,694,599 | Porter et al. | Nov. 16, 1954 |
| 2,710,224 | Horvath | June 7, 1955 |
| 2,782,054 | Nelson | Feb. 19, 1957 |
| 2,846,267 | Fields | Aug. 5, 1958 |
| 2,853,341 | Morse | Sept. 23, 1958 |

UNITED STATES PATENT OFFICE
CERTIFICATE OF CORRECTION

Patent No. 3,149,881                                    September 22, 1964

John Phil Felburn

It is hereby certified that error appears in the above numbered patent requiring correction and that the said Letters Patent should read as corrected below.

Column 3, line 39, after "way with" insert -- the --; column 4, line 7, for "tbe" read -- be --; column 11, line 70, for "factor" read -- tractor --; line 73, strike out "including a base section secured to said tractor, a terminal".

Signed and sealed this 9th day of February 1965.

(SEAL)
Attest:

ERNEST W. SWIDER                                    EDWARD J. BRENNER
Attesting Officer                                         Commissioner of Patents